United States Patent [19]

Alvarez

[11] Patent Number: 5,301,343
[45] Date of Patent: Apr. 5, 1994

[54] SYSTEM HAVING MICROPROCESSOR LOCAL MEMORY EXPANSION CAPABILITY THROUGH REMOVABLE COUPLING OF LOCAL MEMORY EXPANSION BOARDS DIRECTLY TO THE HIGH SPEED MICROPROCESSOR LOCAL BUS

[75] Inventor: Richard D. Alvarez, Boca Raton, Fla.

[73] Assignee: International Business Machines Corp., Armonk, N.Y.

[21] Appl. No.: 636,175

[22] Filed: Dec. 31, 1990

[51] Int. Cl.5 .............................................. G06F 13/00
[52] U.S. Cl. ..................................... 395/800; 395/325; 395/425; 364/929.5; 364/968; 364/970.5; 364/DIG. 2
[58] Field of Search .................. 395/800, 325, 425

[56] References Cited

U.S. PATENT DOCUMENTS

| | | | |
|---|---|---|---|
| 4,575,792 | 3/1986 | Keeley | 395/575 |
| 4,658,375 | 4/1987 | Onogi et al. | 395/275 |
| 4,837,739 | 6/1989 | McGill et al. | 395/325 |
| 4,870,704 | 9/1989 | Matelan et al. | 395/800 |
| 4,888,773 | 12/1989 | Arlington et al. | 371/40.2 |
| 4,916,603 | 4/1990 | Ryan et al. | 395/425 |
| 4,933,845 | 6/1990 | Hayes | 395/325 |
| 4,949,298 | 8/1990 | Nakanishi et al. | 395/425 |
| 5,017,141 | 5/1991 | Relf et al. | 434/29 |
| 5,091,850 | 2/1992 | Culley | 395/400 |
| 5,095,428 | 3/1992 | Walker et al. | 395/425 |
| 5,126,910 | 6/1992 | Windsor et al. | 361/42 |
| 5,175,836 | 12/1992 | Morgan | 395/425 |
| 5,199,033 | 3/1993 | McGeoch et al. | 371/10.1 |
| 5,218,684 | 6/1993 | Hayes et al. | 395/400 |

OTHER PUBLICATIONS

C. Warren, "Independents Jump On the IBM Bus with Personal Computer Add-Ons", EDN Electrical Design News, vol. 27, No. 6, Mar. 1982, pp. 81–84.
Alsup, "Motorola's 88000 Family Architecture", IEEE Jun. 1990, pp. 48–66.
Goss, "Motorola's 88000: Integration, Performance and Applications", IEEE, Feb. 1989, pp. 20–26.

*Primary Examiner*—Thomas C. Lee
*Assistant Examiner*—Paul Harrity
*Attorney, Agent, or Firm*—Daniel E. McConnell

[57] ABSTRACT

This invention relates to a personal computer having facility for ready variation in the amount of memory capability available on the microprocessor local bus. The personal computer has a microprocessor, a high speed local bus coupled to said microprocessor, a system bus, a bus controller coupled to and providing communication between the local bus and system bus, and a local bus memory facility coupled to and physically separable from the local bus. The local bus memory facility is provided by a substrate, preferably a printed circuit card, for mounting and providing coupling connections among components mounted thereon, at least one volatile memory component mounted on the card, and a memory controller mounted on the card and coupled to the volatile memory component, local bus and bus controller, with the memory controller regulating communications between the volatile memory component and microprocessor.

12 Claims, 5 Drawing Sheets

SYSTEM HAVING MICROPROCESSOR LOCAL MEMORY EXPANSION CAPABILITY THROUGH REMOVABLE COUPLING OF LOCAL MEMORY EXPANSION BOARDS DIRECTLY TO THE HIGH SPEED MICROPROCESSOR LOCAL BUS

TECHNICAL FIELD

This invention relates to personal computers, and more particularly to a personal computer having facility for ready variation in the amount of memory capability available on the microprocessor local bus.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a principal system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70, 80, 90 and 95.

These systems can be classified into two general families. The first family, usually referred to as Family I models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have use the popular INTEL 8088, 8086 or 80286 microprocessor as the principal processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

More recently, the technology embodied in the Intel microprocessors used in personal computers has been proposed for use in more advanced computer environments, such as tightly or loosely coupled parallel or multiple processing arrays. As the higher speed microprocessor technology is applied to such arrays, problems heretofore encountered in personal computer technology as here defined may be anticipated as appearing in such environments.

With the advent of newer operating systems designed in part to use the greater memory addressing capabilities of higher speed microprocessors there has come a need to provide facility for expansion of memory into the higher ranges. Such expansion is being accomplished using devices known as single inline memory modules, or SIMMs, made up from memory modules having varying memory capabilities. While such expansion has been accomplished (in part using strategies described more fully hereinafter), the use of ever faster microprocessors causes quality and time-of-flight of signals exchanged in memory access to become more critical. By "time-of-flight" is meant the amount of time necessary for a signal to be exchanged, such as for a data or address or other control signal to be exchanged between physical memory modules and the principal processor.

Looking toward the expansion of memory which may become desirable as an existing personal computer is adapted to developing technology, problems arise as SIMMs are used in accommodate such needs. In particular, while SIMMS of varying capacity such as 1, 2, 4 or 8 megabytes and using an assortment of different memory modules may be inserted onto a local memory bus, the number of sockets required to physically hold such SIMMs and variations among them lead to impedance mismatching. Solutions for such impedance mismatching are available, and require increased buffering (leading to slowing of memory accessing or time-of-flight) or more advanced semiconductor technology (leading to increased expense).

An alternative to SIMMs used in some computing environments is the SIPP (Single In-line Pin Package) memory module. The difference between a SIMM and a SIPP arises from the form of connector used—SIMMs use card edge connectors, while SIPPs use header pins. While the two forms are not interchangeable in terms of installation into a computer system environment, similar types of problems arise in systems using memory expansion with SIMMs and those using SIPPs.

An alternative approach is the use of memory expansion cards or boards accessed through the portion of the bus architecture provided for installation of option cards or boards such as is known for example, in the more advanced personal computers described above, as the MICROCHANNEL bus. While such an approach is viable, the installation of additional memory capability by installation of an option card uses up a scarce resource (slots on the bus) and slows access to the added memory. Further, such additions require more expensive data drivers which potentially increase electromagnetic compatibility emissions and which, in turn, lead to the use of preventative measures which cause signal under- or over-shoot and timing skew problems.

BRIEF DESCRIPTION OF THE INVENTION

With the above discussion in mind, it is an object of this invention to provide, in a computer of the general type described, the possibility of readily varying the amount of memory available on the microprocessor local bus. In realizing this object of the present invention, one or more local memory expansion cards (as desired or required) are mounted to be accessed by the principal microprocessor.

A further object of this invention is to provide for memory capability expansion while preserving favorable quality and time-of-flight for signals exchanged with memory modules. In realizing this object of the present invention, memory modules are coupled to the microprocessor local bus, as distinguished from a system bus, planar input/output (I/O) bus, or adapter card (for example MICRO CHANNEL) bus. Further, the coupling of the memory modules is accomplished using controllers which present to the bus a common interface regardless of the physical insertion or removal of additional memory modules.

Another object of the invention is to provide expansion cards which may be readily physically installed or removed so as to enable memory expansion or (possibly) contraction. In realizing this object of the present invention, a user of a personal computer structured in accordance with this invention may initially begin with a computer having only the minimum memory capability appropriate to initial needs, and thereafter readily expand or adjust memory capability to meet changing needs. Further, such adjustment may be readily accomplished at the location of use of the computer with minimal down-time or removal of the computer from service.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. In particular, persons of skill in the arts relating to computer design and use will recognize that this invention, while described hereinafter with particular reference to personal computers, is applicable to computers over a wide range of sizes and types, including those previously known as mainframes and midsize or minicomputers.

Figure 1:
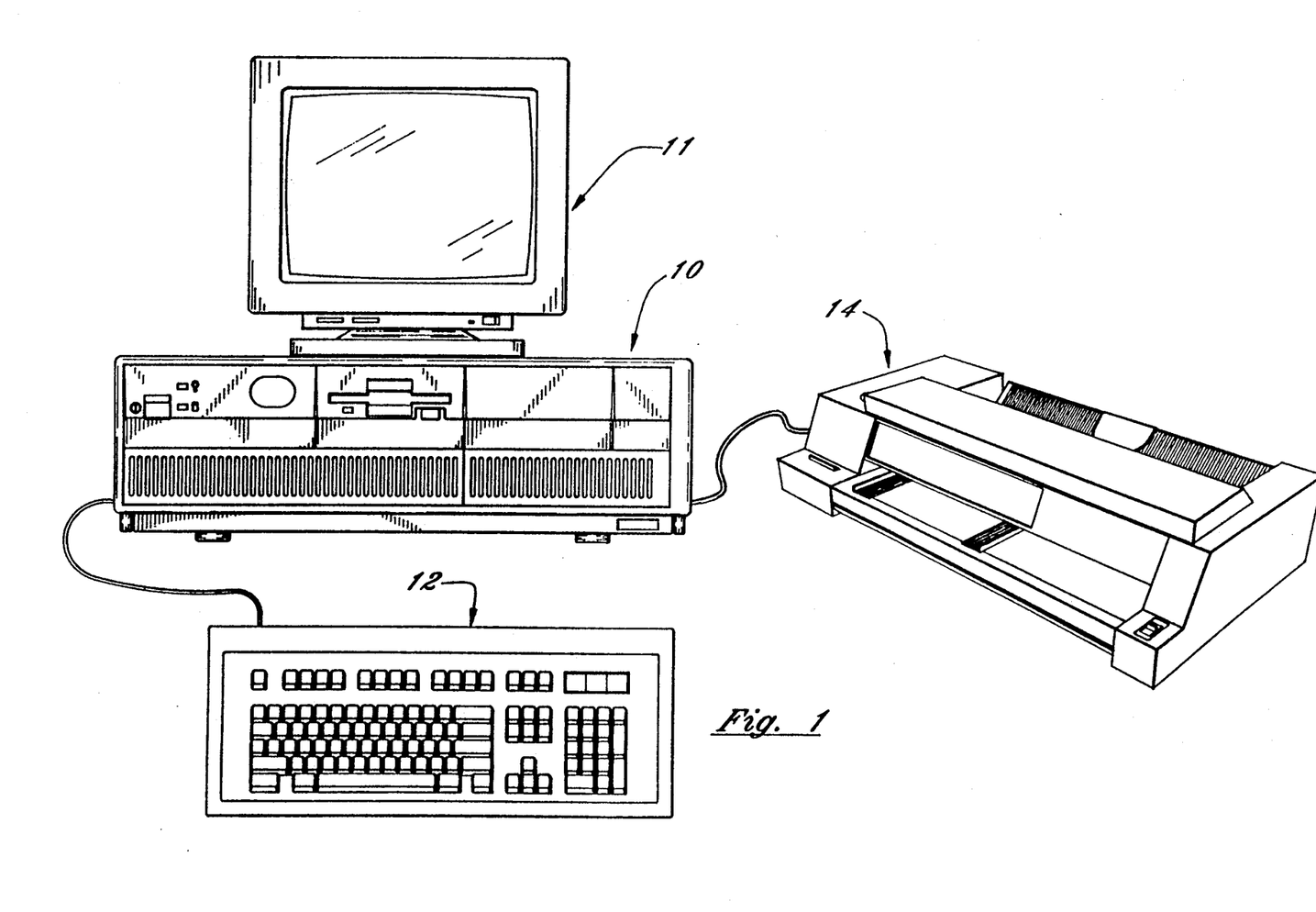
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
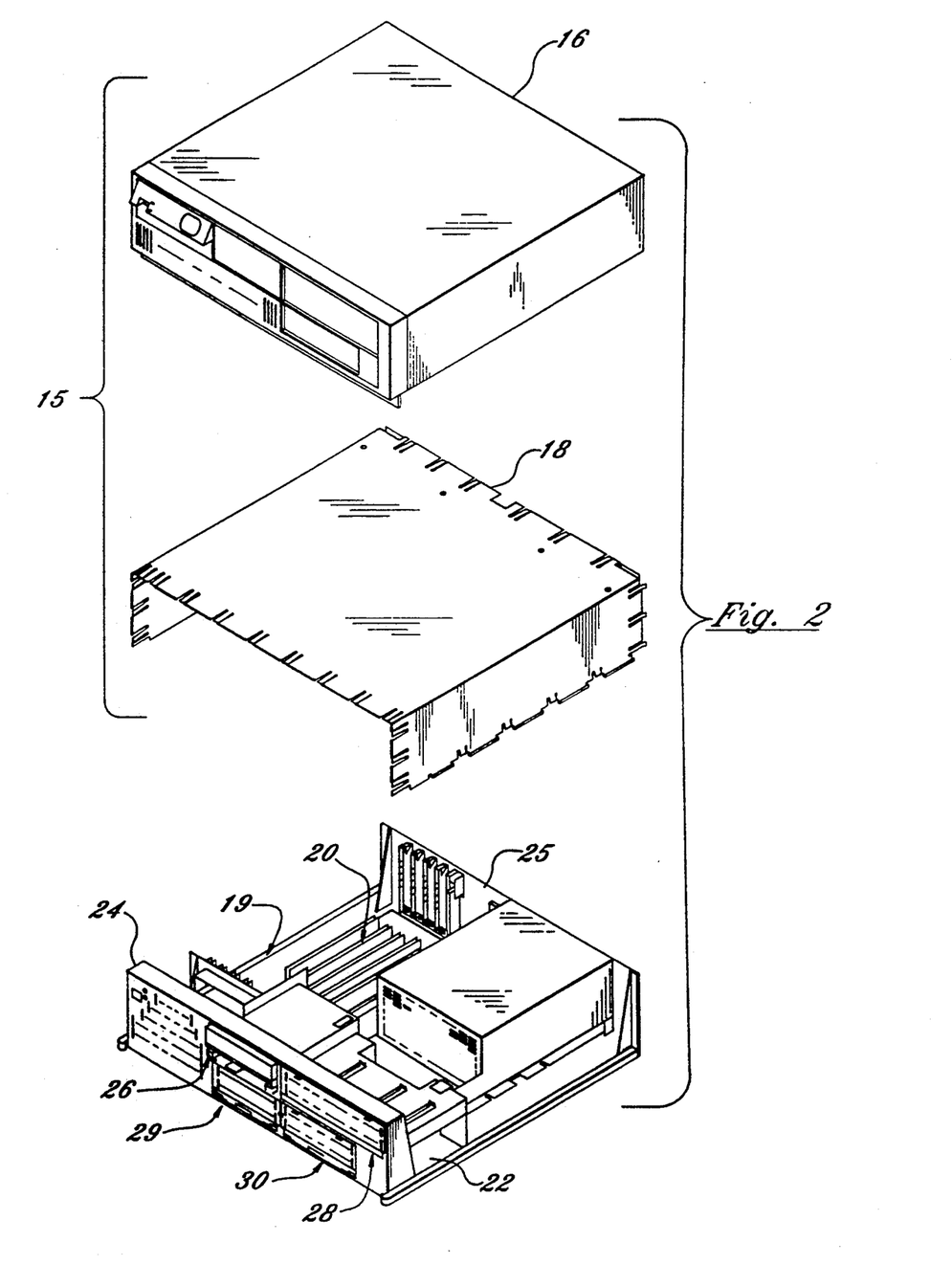
FIG. 2 is an exploded perspective view of certain elements of the personal computer of FIG. 1 including a chassis, a cover, and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch).

Figure 3:
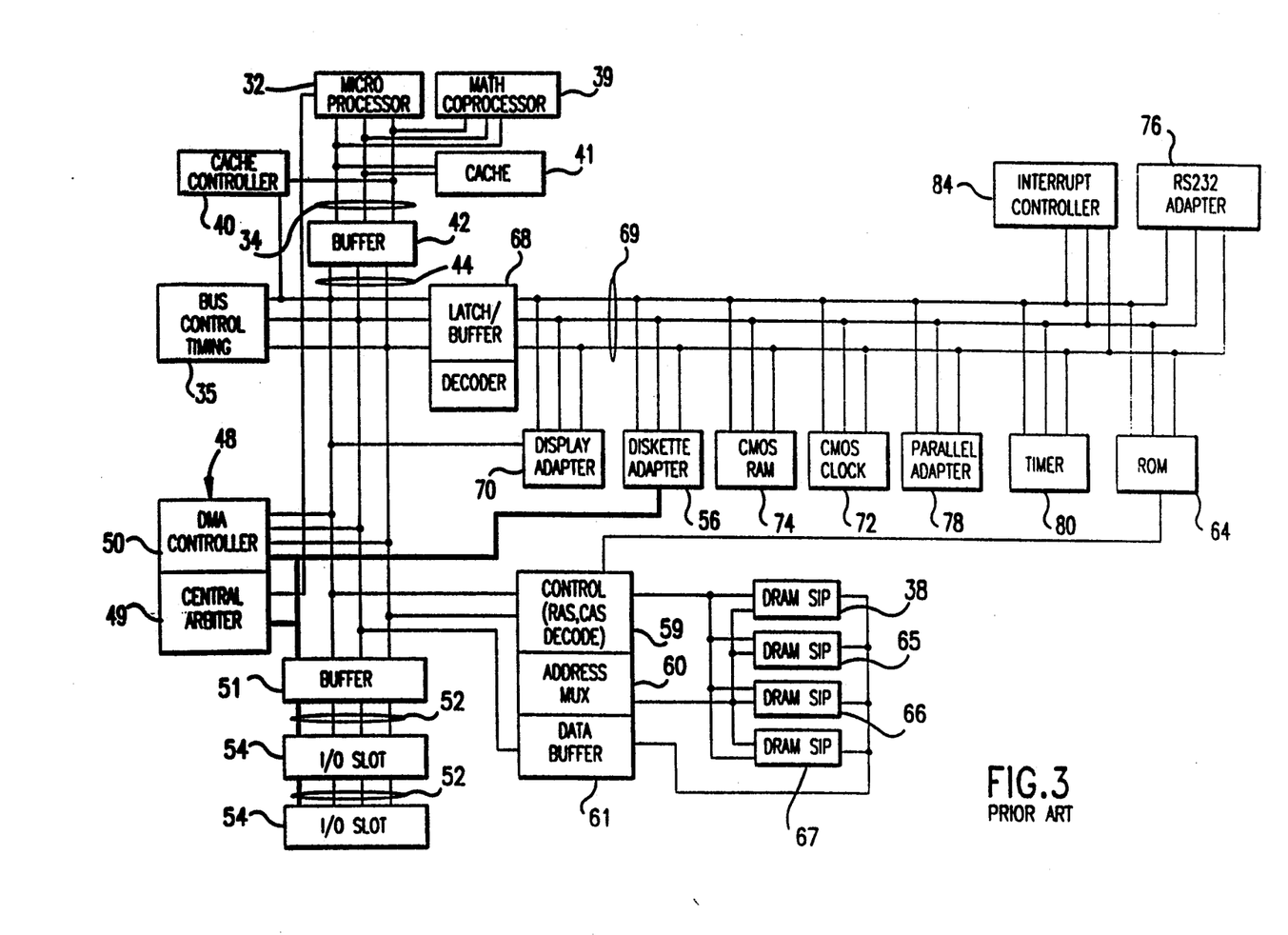
FIG. 3 is a schematic view of certain components of a personal computer as arranged in accordance with practice generally followed prior to the present invention.

Prior to relating the above structure to the present invention, a summary of the operation in general of a personal computer system as generally architected prior to the present invention may merit review. Referring to FIG. 3, there is shown a block diagram of a personal computer system illustrating the various components of such a computer system, including components mounted on the planar and the connection of the planar to the I/O slots and other hardware of the personal computer system. Connected to the planar is the principal processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention will be described hereinafter with particular reference to the system block diagram of FIG. 4, it is to be understood at the outset of the description of FIG. 3 which follows that it is contemplated that the apparatus and methods in accordance with the present invention may be used with other hardware configurations of the planar board. For example, the system processor could be an Intel 80286 or 80486 microprocessor. Further, the system may be one which uses multiple processors arranged in some suitable array.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICROCHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system of FIG. 3 is shown with a basic 1 megabyte RAM module, it is understood that additional memory can be interconnected as represented by the optional memory modules 65 through 67.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

Figure 4:
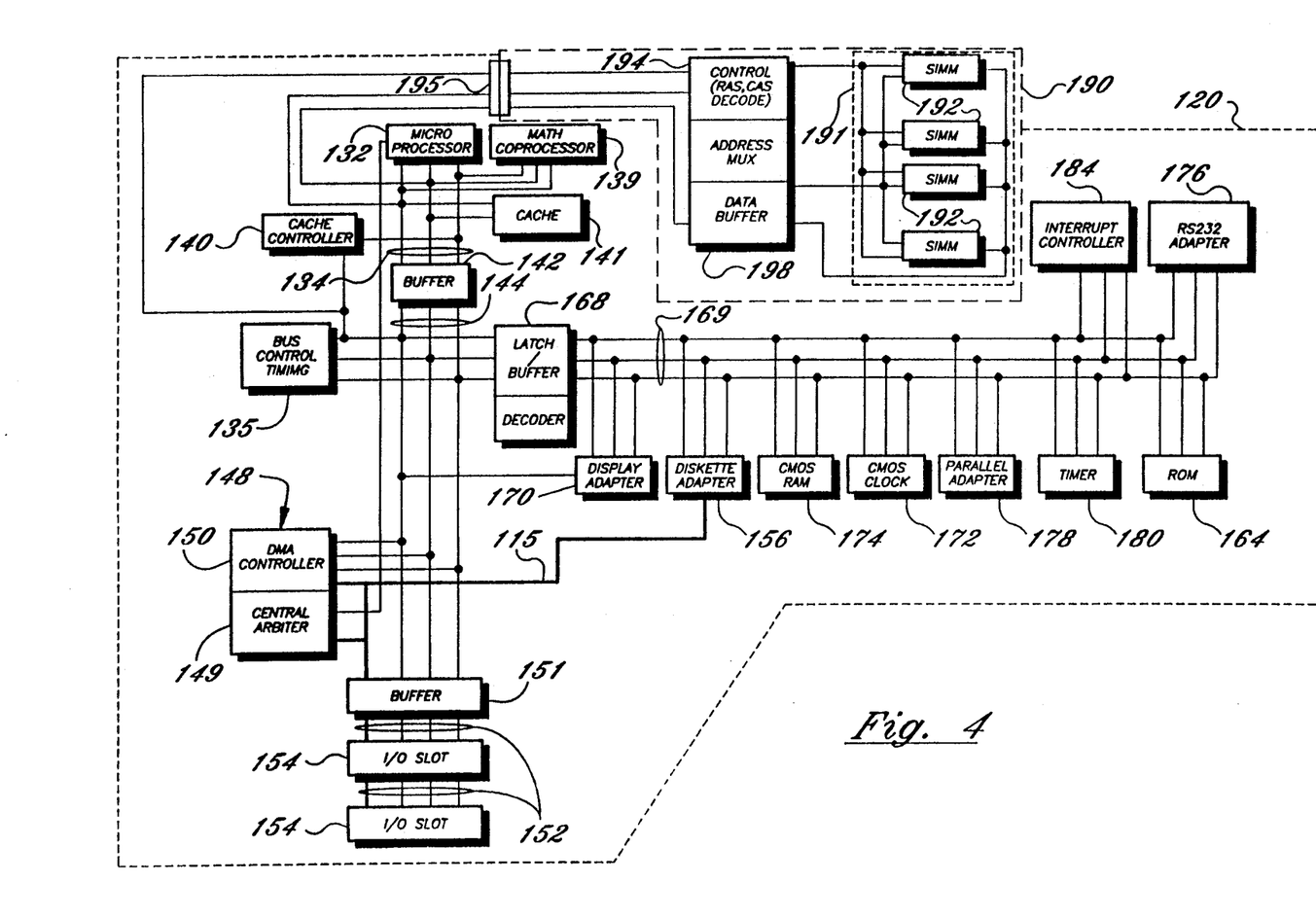
FIG. 4 is a view similar to FIG. 3 showing the arrangement of certain components of the personal computer of FIGS. 1 and 2 in accordance with this invention.
Figure 5:
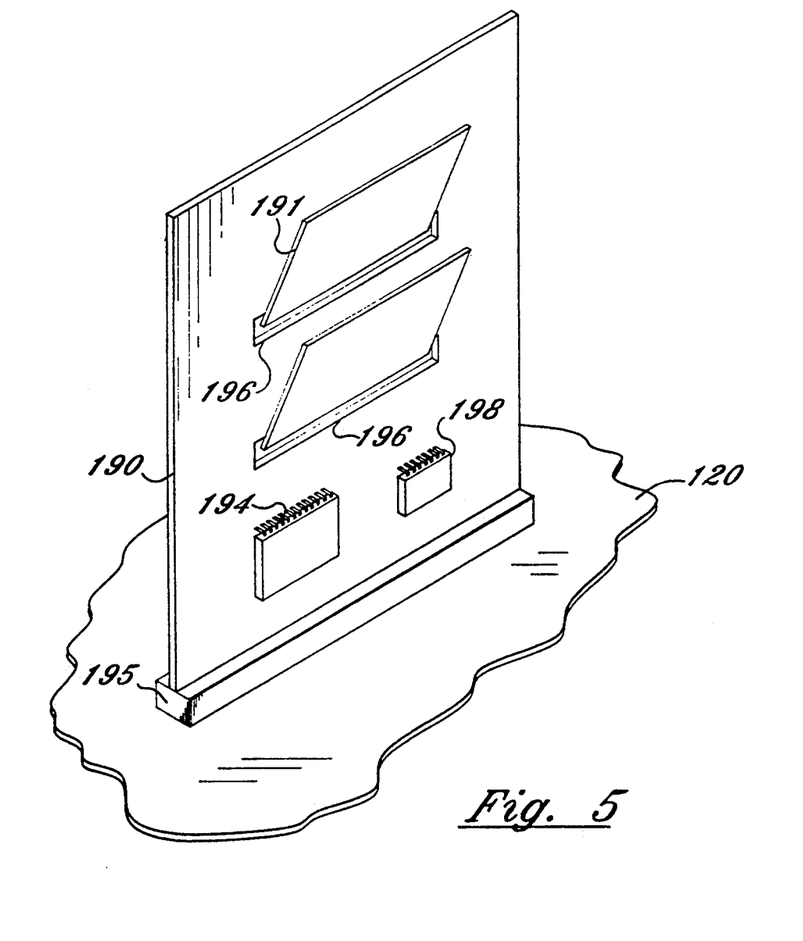
FIG. 5 is an enlarged, perspective view of portions of the personal computer of FIGS. 1, 2 and 4.

Referring now to FIGS. 4 and 5, attention will be directed to the distinguishing features of the present invention. Many of the operating components of a personal computer embodying this invention are identical to those of the previously architected computer just described, and such components will not here be described at length in the interest of eliminating redundancy. Instead, like reference characters of a 100 order of magnitude are applied.

More particularly, it will be noted that the personal computer of this invention provides at least one local bus memory facility coupled to and physically separable from the cpu local bus 134. In accordance with this invention, such a facility comprises a substrate for mounting and providing coupling connections among components mounted thereon, preferably in the form of a substrate printed circuit card or board 190. At least one volatile memory component, illustrated as a SIMM 191 having a plurality of memory modules 192 such as DRAM integrated circuit chips, is mounted on the substrate 190. The card or board 190 also mounts a memory controller 194 which is coupled to the volatile memory component 191 and the local bus 134. The card mounted memory controller 194 regulates communications between the volatile memory component 191 and the microprocessor 132.

As illustrated in FIG. 5, a personal computer in accordance with this invention preferably has a plurality of sockets 195 mounted on the system planar and connected by planar pathways to the cpu local bus 134. Thus provision is made for the manual insertion and removal of a plurality of memory expansion cards 190. Each memory expansion card 190 has a plurality of SIMM sockets 196 mounted thereon and connected by pathways on the card 190 to the resident memory controller 194 and to a data driver 198 which provides impedance matching buffering, although in some critical applications the delay caused by buffering could be offset by the use of very fast logic technologies such as ECL TTL. The use of the data driver is contemplated as permitting the interface between a memory expansion card in accordance with this invention and the cpu local bus 134 to be fully specified while being isolated.

It is significant to note that there is a difference in the location of the volatile memory in the architectures of FIGS. 3 and 4. More specifically, the volatile memory in FIG. 3 is coupled to the system bus 44, while in FIG. 4 it is coupled to the cpu local bus 134. The architecture of this invention also has a system bus 144 (FIG. 4), however the memory coupling is handled differently. It is the latter characteristic, in part, which enables the provision of a resident memory controller 194 on each of a plurality of expansion cards which, in turn, makes possible the ease in modification of memory facility which is an object of this invention.

The use of a local bus memory expansion card such as the card 190 allows for a reduction in cost for a low end user in that a consumer may buy a personal computer with minimal memory capability installed while maintaining the possibility of upgrading memory. While prior architecture (such as FIG. 3) may be open to such a possibility, the memory controllers required and the location among the bus architecture is such that a more expensive controller is required and access times between memory and the processor are slowed.

For a high end or "power" user who buys a product intended for maximum expandability, the use of the optional card bus for memory expansion would significantly slow system performance. In contrast, use of cpu local bus memory expansion decreases time-in-flight for memory access signals while accommodating expansion by use of any available SIMM configuration.

The use of the cpu local bus for volatile memory access and expansion and a common specified interface similar to the SIMM memory interfaces used before the present invention allows the use of the interchangeable cards 190 as described above. Further, the cards 190 may use any of a wide variety of memory modules, both as known at the time of this invention and developed in the future, through the use of the on-board memory controller. Service and down time are minimized, as either an entire card or a SIMM mounted thereon may be isolated by offsetting addresses during configuration or reconfiguration of a system.

The total amount of memory carried by any given one card 190 may be determined by a memory test or from sense bits. Control signals are handled by a bus interface unit (BIU), operatively coupled with the bus control timer 135.

As illustrated (FIG. 5), the card 190 preferably is mounted to extend at right angles to a system planar 120. SIMMs 191 mounted on the card 190 are angled to permit ventilation while maximizing the memory potentially mountable on a corresponding card 190. Both sides of the card 190 may be populated (the back side not being visible in FIG. 5), opening the possibilities of providing both a substantial range of memory capability on each card and very large total capacity on a single card where memory technology permits densities up to eight megabytes per SIMM.

In the drawings and specifications there has been set forth a preferred embodiment of the invention and, although specific terms are used, the description thus given uses terminology in a generic and descriptive sense only and not for purposes of limitation.

What is claimed is:

1. A computer system comprising:
   a microprocessor;
   a high speed microprocessor local bus directly coupled to said microprocessor;
   a system bus;
   a bus controller coupled to and providing communication between said local bus and said system bus; and
   a local bus memory facility directly coupled to and which can be physically separated from said local bus, said facility comprising:
      a substrate for mounting and providing coupling connections among components mounted thereon;
      at least one volatile memory component mounted on said substrate; and
      a memory controller mounted on said substrate and coupled to said at least one volatile memory component and said local bus and said bus controller, said memory controller being operatively interposed between said at least one volatile memory component and said local bus and regulating communications between said volatile memory component and said microprocessor.

2. The computer system according to claim 1 further comprising a system planar mounting said microprocessor and providing operative communication among said microprocessor, said local bus, said system bus and said bus controller, and further comprising a socket mounted on said system planar for removably receiving said local bus memory facility, said socket for establishing communication between (a) said at least one volatile memory component and said memory controller of said local bus memory facility received therein and (b) said microprocessor, local bus, system bus and bus controller.

3. The computer system according to claim 2 wherein said socket mounts said local bus memory facility inserted thereinto with said substrate thereof extending at a right angle to said system planar.

4. The computer system according to claim 2 wherein said local bus memory facility is a printed circuit board and further comprising a plurality of memory component sockets mounted on said circuit board for removably receiving a corresponding plurality of memory components.

5. The computer system according to one of claim 1 or claim 2 or claim 3 or claim 4 wherein said substrate has a memory capacity in the range of from 1 megabyte to sixty four megabytes.

6. A personal computer system comprising:
   a microprocessor;
   a high speed microprocessor local bus directly coupled to said microprocessor;
   a system bus;
   a bus controller coupled to and providing communication between said local bus and said system bus; and
   a local bus memory facility directly coupled to and which can be physically separated from said local bus, said facility comprising:
      a plurality of substrates each said substrate for mounting and providing coupling connections among components mounted thereon, each said substrate having:
         at least one volatile memory component mounted thereon; and
         a memory controller mounted thereon and coupled to said at least one volatile memory component and said local bus and said bus controller, said memory controller being operatively interposed between said at least one volatile memory component and said local bus and regulating communications between said at least one volatile memory component and said microprocessor.

7. A personal computer system comprising:
   a microprocessor;
   a high speed microprocessor local bus directly coupled to said microprocessor;
   a system bus;
   a bus controller coupled to and providing communication between said local bus and said system bus; and
   a local bus memory facility directly coupled to and which can be physically separated from said local bus, said facility comprising:
      a plurality of substrates each said substrate for mounting operating components and providing coupling connections among components mounted thereon, wherein each said substrate can be physically separated from said local bus and having:
         at least one volatile memory component mounted thereon and which can be physically separated therefrom; and
         a memory controller mounted thereon and coupled to said at least one volatile memory component and said local bus and said bus controller, said memory controller being operatively interposed between said at least one volatile memory component and said local bus and regulating communications between said at least one volatile memory component and said microprocessor.

8. The personal computer system according to one of claim 6 or claim 7 further comprising a system planar mounting said microprocessor and providing operative communication among said microprocessor, said local bus, said system bus and said bus controller, and further comprising a plurality of sockets mounted on said system planar each for removably receiving a corresponding one of said plurality of substrates and for thereby establishing communication between (a) said at least one volatile memory component and said memory controller mounted on said corresponding one of said plurality of substrates and (b) said microprocessor, local bus, system bus and bus controller.

9. The personal computer system according to claim 8 wherein each of said plurality of sockets mounts said corresponding one of said plurality of substrates to extend at a right angle to said system planar.

10. The personal computer system according to claim 8 wherein each of said plurality of substrates is a printed circuit board and further comprising a plurality of memory component sockets mounted on said circuit board for removably receiving a corresponding plurality of memory components.

11. The computer system according to one of claim 1 or claim 2 or claim 3 or claim 4 or claim 6 or claim 7 wherein each said memory component comprises a single inline memory module having a memory capacity of at least one megabyte.

12. The computer system according to one of claim 1 or claim 2 or claim 3 or claim 4 or claim 6 or claim 7 wherein each said memory component comprises a single inline memory module selected from among the group consisting of single inline memory modules with memory capacities of one megabyte, two megabytes, four megabytes and eight megabytes.

* * * * *